United States Patent [19]
Hunsinger et al.

[11] Patent Number: 5,897,691
[45] Date of Patent: Apr. 27, 1999

[54] TELESCOPING CANISTER FOR CONTAINING FILTER MATERIAL

[75] Inventors: Gary J. Hunsinger, Pittsford; Michael Leggett, Honeoye Falls, both of N.Y.

[73] Assignee: Shawndra Products, Inc., Lima, N.Y.

[21] Appl. No.: 08/949,675

[22] Filed: Oct. 14, 1997

[51] Int. Cl.⁶ ................................................. B01D 46/30
[52] U.S. Cl. ..................... 96/108; 55/517; 55/DIG. 5; 96/147; 96/149; 96/151
[58] Field of Search ............................. 96/108, 147, 118, 96/149, 151; 55/512, 513, 517, 516, 518, 519, DIG. 5

[56] References Cited

U.S. PATENT DOCUMENTS

| | | | |
|---|---|---|---|
| 2,323,160 | 6/1943 | Stecher et al. | 55/516 |
| 2,593,132 | 4/1952 | Gannon | 96/151 |
| 2,702,089 | 2/1955 | Engelder | 55/516 |
| 2,728,407 | 12/1955 | Squier | 55/516 |
| 2,751,999 | 6/1956 | Semon | 55/513 |
| 3,240,567 | 3/1966 | Caparreli et al. | 96/149 |
| 3,681,899 | 8/1972 | Grote | 96/147 |
| 4,867,770 | 9/1989 | Feeney | 55/517 |
| 5,034,039 | 7/1991 | Goddard | 96/151 |
| 5,673,493 | 10/1997 | Kazakis et al. | 55/517 |

*Primary Examiner*—Duane S. Smith
*Attorney, Agent, or Firm*—James Ray & Associates

[57] ABSTRACT

A compact canister assembly for containing a filter media. The assembly includes an outer metal container, an inner structure of filter media and an inner metal container for insertion into an open end of the outer metal container and over the inner structure of the filter media. The inner metal container has an end exposed at the open end of the outer metal container and an end structure closing the end of the outer metal container opposite the end receiving the inner metal container. An end structure is also provide for closing the exposed end of the inner container. The end structures include at least one layer of an air permeable material that permits air flow through said layer and through the inner structure of filter media while retaining the filter media within the canister assembly. The inner structure of filter media is longer than the combined length of the metal containers when they are telescoped together to compact the filter media within the telescoped containers.

11 Claims, 2 Drawing Sheets

TELESCOPING CANISTER FOR CONTAINING FILTER MATERIAL

FIELD OF INVENTION

The present invention relates, generally, to canisters for containing filter materials or filter members and, more particularly, to a telescoping or sliding canister assembly that can be used to compact particles of filter material and which canisters can be cemented to secure the assembly together.

BACKGROUND OF INVENTION

Canisters used for containing a desiccant media designed to absorb moisture use a flexible bag made of an air permeable polyester mesh material to contain the media. The bag is difficult to manufacture in that the process begins with a piece of rectangular polyester mesh material which a seamstress sews two opposed sides of the rectangular piece together. This creates an open ended flexible cylinder. A circular piece of a mesh material is then sewn to one end of the flexible cylinder to provide a bottom for the cylinder. A second circular piece of mesh material is sewn part way to the upper end of the cylinder. The part way sewing provides an upper seam having a distance of about ¾ of the circumference of the cylinder. This leaves a ¼ "open" container, which is then filled with a desiccant particulate media and weighed. The incompleted upper seam of the open end is then completed by hand stitching to close the cylinder.

The mesh bag is flexible and manipulative thereby making it hard to handle during the sewing and filling process. The bags are, thus, not filled consistently because of the bag instability and the above complexity of the manufacturing process. This, in turn, has led to varying bag sizes as manufacturers endeavor to find a bag size that will provide the correct amount of desiccant media for the customer. The result has been a variety of bag sizes resulting in differing product performance in the process of absorbing moisture. The above weighing step does not ensure a proper amount of desiccant. Desiccant pellets vary in size & density. A "full" bag has varied from three to four plus pounds. Also, in shipment, the desiccant settles so that a "full" bag at the start of the manufacturing process, in many instances, does not remain full.

For shipping and ease of installation, the mesh bag is inserted into a metal cylinder and the combination placed in a plastic bag.

When the customer receives the metal cylinder containing the mesh bag and desiccant media, the metal cylinder is removed from the plastic bag and placed atop a dryer cavity and the plastic bag discarded. Using a minimal force against the bag, the bag is manually inserted into the cavity from the cylinder. With the bag located in the dryer cavity, the metal shipping container is removed from atop the cavity and discarded.

For those field personnel experienced in installing the flexible bag, the above process is rather straightforward but the discard of the plastic bag and metal cylinder is wasteful.

SUMMARY OF THE INVENTION

The present invention is directed to the use of a hard canister configuration for containing a fixed volume of filter media such as a desiccant, the size of the volume being chosen for a particular filtering task. Other types of filter media may include molecular sieves, activated alumna and activated carbon. The canister per se comprises two rigid, inter-fitting metal containers, the cross section of the outer one being slightly larger than that of the inner one such that they can be easily slipped or telescoped together. When slipped together, they provide a single, hard wall canister structure.

Before the containers are slipped together, a filter media or component is inserted into one of the containers such that the media or component is enclosed and contained by the containers when they are placed together. If the filter media is a particulate, an empty fabric bag with one open end can be inserted into one of the containers and the material of its upper (open) end folded over the upper end of the container. The bag is then filled with the particulate media, the rigid wall of the container holding the bag in place and providing a consistent standard to which the bag is filled.

The two hard wall containers have opposed ends that are provided with openings for receiving mesh media that closes the assembly but is permeable to the flow of air so that air can pass through the mesh ends and telescoped containers and through the filter media contained therein. The canister containers fully contain the filter media without escape of the filter material. The metal containers and ends are secured together by use of a metal adhering, moldable compound to form a compact, unitary fully integrated canister structure.

In addition, a seal material is preferably molded to the intake end of the unitary canister structure to prevent incoming air from bypassing desiccant or other filter media contained within the assembly of the canister structure. The mesh material at the ends of the unitary canister filters air before and after the filter media within with the canister assembly receives the air.

OBJECTIVES OF THE INVENTION

It is, therefor, an objective of the invention to provide a two-piece, hard wall canister assembly for containing a fabric bag of desiccant or other filter media or component while at the same time providing air permeable end structures that provide additional filtering of air flowing through the canister assembly. The hard canister walls prevent deformation of the desiccant container during bag manufacture, filling, shipping, inventory storage and final product installation in an air drying system.

Another objective of the invention is to provide a unitary two-piece, metal canister having ends that are adhered to the fabric bag to secure the two pieces (containers) of the canister together.

Yet another objective of the invention is to provide a metal canister of a controlled height or length, and thus an easily controlled amount of filter media, so that one does not have to rely on the heights or lengths of flexible bags of filter media to provide a correct amount of filter media.

A further objective of the invention is to provide compression of the desiccant material by telescoping canister components together. Such compression prevents particulates or pellets of desiccant material from moving and colliding within the canister when the canister is subjected to vibration and other harsh motion. Sustained collision of the pellets reduces the pellets to a powder. Powder material is more difficult to contain, but can not be allowed to enter into an air system used for brakes, for example. Compression of the pellets by the telescoped canister packs the pellets together and allows the customer to install the canister without first compressing the pellets.

THE DRAWINGS

The invention, along with its objectives and advantages, will be better understood from consideration of the following detailed description and the accompanying drawings in which:

FIG. 1 is a diagrammatic representation of the canister assembly of the invention, FIG. 2 is an isometric view of the assembly of FIG. 1, and FIG. 3 shows the canister of the invention located in a drier cavity and provided with an air intake seal.

PREFERRED EMBODIMENT OF THE INVENTION

Referring now to FIG. 1 of the drawings, a telescoping canister assembly 10 is shown somewhat schematically for containing a fabric container 12 of desiccant or other filter media (not otherwise shown). Assembly 10 comprises an outer metal container 14 and an inner metal container 16 sized slightly smaller than the outer container so that it slips into the outer container. The two containers are, in turn, sized to receive fabric container 12 and to compact media particulates in the fabric container to a known volume when the two cylinders 14 and 16 are pushed together against container 12. If the filter material is a desiccant, it can be contained in a bag of air permeable fabric media of the type used in the prior practices discussed above. An empty bag can be placed in one of the metal containers and then filled with filter media, the metal container retaining the shape of the bag and providing a consistent height to which the bag is filled.

The bag is sized to fill the canister of assembly 10 when compacted by the assembly to provide the air drying or other filtering function of the assembly in an efficient manner.

More particularly, as seen in FIG. 1, the finished height of fabric container 12 before it is placed in assembly 10 is substantially greater than the height of outside container 14 and longer than the combined length of metal containers 14 and 16 when they are assembled together. In this manner, when the two containers 14 and 16 are placed together to enclose fabric container 12, the filter material in the fabric container is compacted to the volume provided by the two containers when they are forced together against the filter material. If the filter material in container 12 is a desiccant, compaction is particularly important. Desiccant materials are generally in the form of particulates, pellets, or crystals, i.e. such particulates as particulates are relatively easy to contain in a container having ends made of air permeable cloth or mesh material because of the size of such particulates. However, with vibration, as might be encountered on a railway car or locomotive, for example, loose crystals of the desiccant can undergo relative movement whereby the loose crystals move to and fro against each other and are thereby reduced to a powder form, which form is more difficult to contain. If the canister assembly with the desiccant material is in a system supplying pressurized air to brakes of a vehicle and desiccant powder escapes into the system, the effectiveness of the brakes of the vehicle can be compromised by the powder. In the present invention, the desiccant particulates are compacted by the telescoped containers (FIG. 2) such that the particulates are not subject to moving about in canister assembly 10 when the vehicle in which the canister assembly is located is in motion.

The enclosed, compacted material in container 12 can remain enclosed and compacted by simply gluing the fabric container 12 to the inside surfaces of the walls of the two canisters 14 and 16 of assembly 10 using a suitable metal and fabric adhering compound. In this manner, the two metal containers are held together in secure relation to the fabric container and to each other.

As seen in FIG. 2 of the drawings, the ends of canister assembly 10 are provided with a mesh material 18 that is air permeable and that contains the filter material within the assembly when air flows through the assembly and mesh material. In FIG. 2, only one end of the assembly is visible. The mesh material preferably includes a wire mesh of aluminum or stainless steel to insure a durable end structure. The wire mesh of 18 is used in conjunction with a cloth fabric (not visible in FIG. 2) to insure retention of the filter material in assembly 10 yet easily permits the passage of air.

Similarly, containers 14 and 16 can also be made of an aluminum or stainless steel sheet metal for the same reason, though the containers can be made from other durable materials.

In addition, the containers of the invention are depicted in the drawings as cylinders, though the containers can have other configurations without departing from the spirit and scope of the invention.

Further, the walls of metal containers 14 and 16 can be solid or perforated. If perforated, the inner wall of fabric container 12 is a solid rigid structure to insure retention of the filter material. A perforated metal wall reduces the weight of assembly 10.

The canister assembly 10 of the invention can be used in an air drying system. Such systems employ a container 20 having a cavity 22 sized to receive a canister. Air to be dried is directed through the cavity and canister as indicated by the arrows depicted in FIG. 3. To ensure that the air entering the cavity is directed through the canister and its filter media, and thus does not by-pass the canister and media, a gasket seal 24 is employed at the intake end of cavity 22 and canister 10. Preferably, the seal is attached to the intake end of the canister so that when it is placed in cavity 22 the seal will be in place between the canister 10 and container 20 to direct air flow through the canister assembly which includes its filter media.

While the presently preferred embodiment for carrying out the instant invention has been set forth in detail above, those persons skilled in the filter or air drying art to which this invention pertains will recognize various alternative ways of practicing the invention without departing from the spirit and scope of the claims appended hereto.

We claim:

1. A compact telescoping canister assembly for containing filter media, said canister assembly comprising:

an outer metal container, an inner structure of filter media, an inner metal container for insertion into an open end of said outer metal container and over said inner structure of filter media, said inner metal container having an end exposed at said open end of said outer metal container, and a first end structure closing an end of said outer metal container opposite said open end receiving said inner metal container, and a second end structure closing said exposed end of said inner metal container, said end structures including at least one layer of an air permeable durable material that permits air flow through said layer and through said inner structure of filter media while retaining said inner structure of filter media in said canister assembly.

2. The canister assembly of claim 1 wherein said inner structure of filter media includes a fabric container that is longer than a combined length of said metal containers when they are telescoped together.

3. The canister assembly of claim 1 wherein said metal containers are made of stainless steel.

4. The canister assembly of claim 1 wherein said metal containers are made of aluminum.

5. The canister assembly of claim 1 wherein said metal containers have a solid cylindrical wall.

6. The canister assembly of claim 1 wherein said metal containers are perforated.

7. The canister assembly of claim 1 wherein said end structures include a layer of stainless steel wire mesh.

8. The canister assembly of claim 1 wherein said end structures include a layer of aluminum wire mesh.

9. The canister assembly of claim 1 wherein said inner structure of filter media includes a container of fabric material made of a polyester material.

10. The canister assembly of claim 1 wherein one end of said canister assembly can be disposed to receive air flow from an external source of pressurized air, said one end being sealed to receive such air flow in a manner that directs such air flow through said inner structure of filter media.

11. A method of assembling a canister structure adapted to hold a filter media, said method comprising:

disposing a fabric container in a first metal container, supplying said fabric container with a filter media of a predetermined volume, locating a second metal container in axial alignment with said first metal container, said first and second metal containers being relatively sized to telescope together, and telescoping said metal containers together to contain said fabric container and said filter media.

* * * * *

UNITED STATES PATENT AND TRADEMARK OFFICE
CERTIFICATE OF CORRECTION

PATENT NO. : 5,897,691
DATED : April 27, 1999
INVENTOR(S) : Gary Hunsinger, et al.

It is certified that error appears in the above-identified patent and that said Letters Patent is hereby corrected as shown below:

Abstract
Line 11, after "also" please delete "provide" and insert -- provided --.

Figure 1:
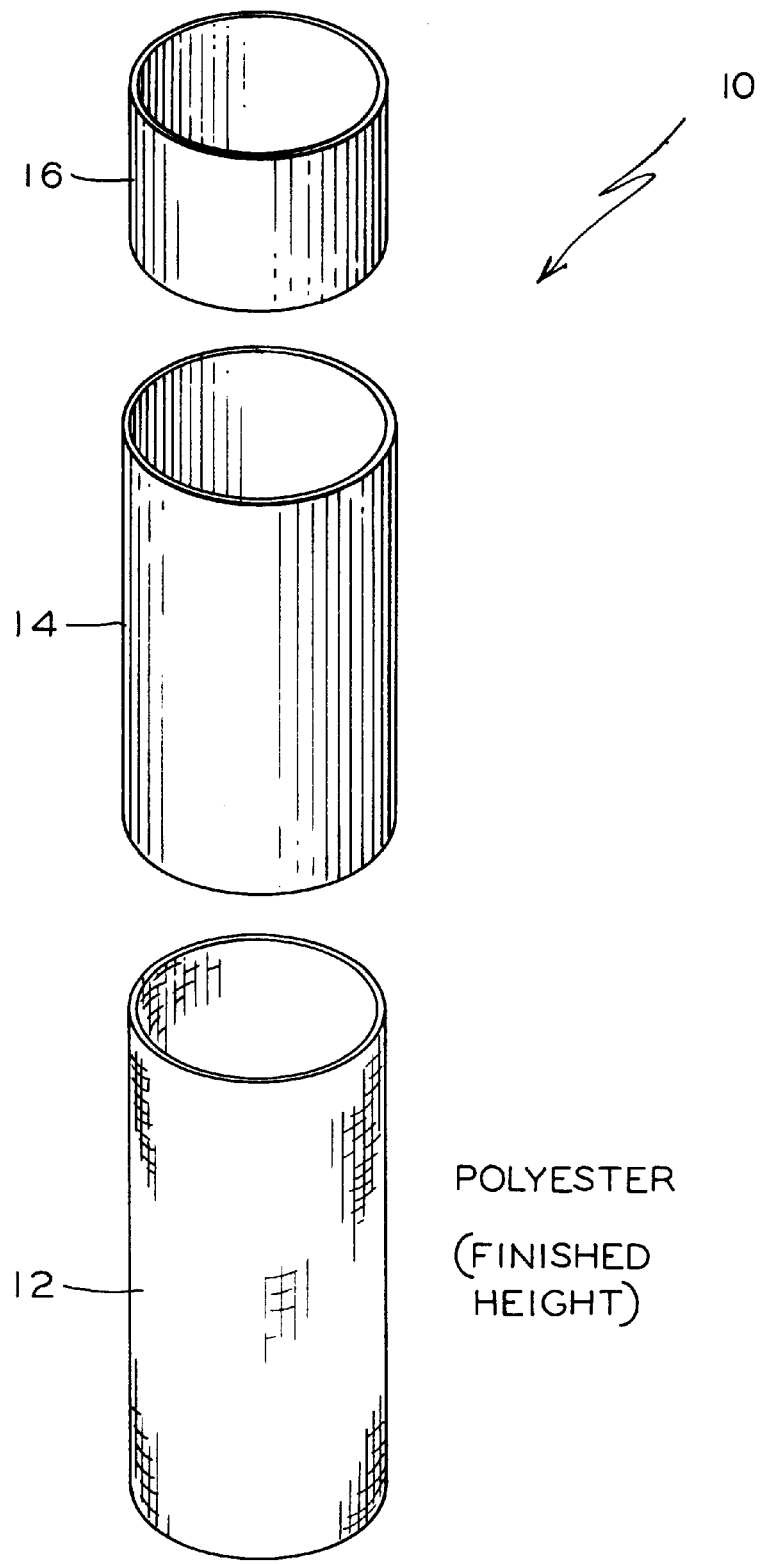
Figure 2:
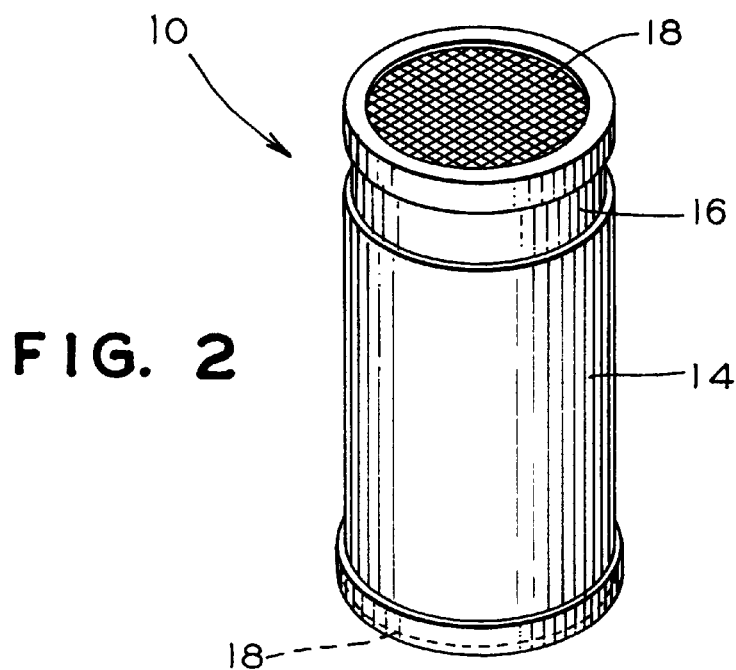
Figure 3:
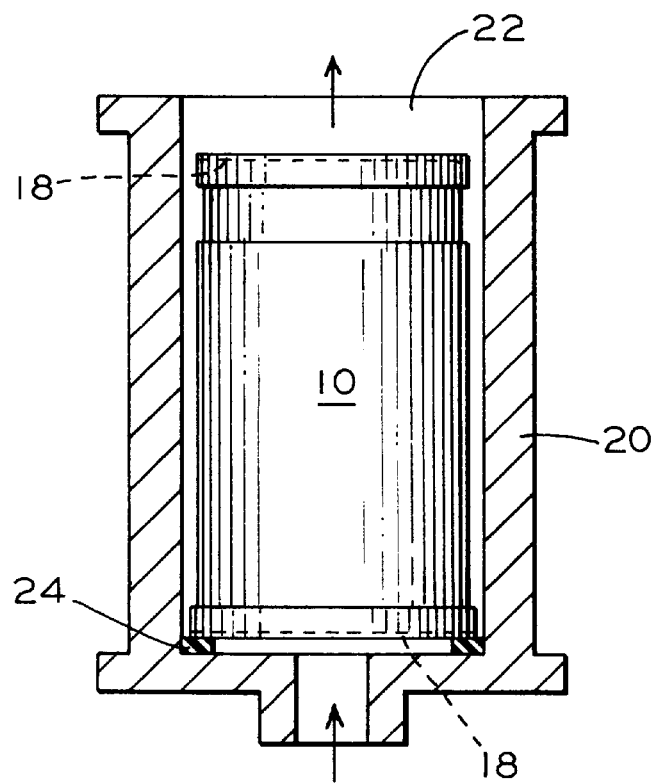

Column 1, line 4, after "OF" please insert -- THE --;
Column 1, line 12, after "OF" please insert -- THE --;
Column 1, line 26, after "container" please delete ",".
Column 2, line 1, please delete "cross section" and insert -- cross-section --;
Column 2, line 29, after "within" please delete "with";
Column 2, line 38, after "bag" please delete "manufacture" and insert --manufacturing --.

Signed and Sealed this

Eighth Day of May, 2001

NICHOLAS P. GODICI

*Attest:*

*Attesting Officer*    Acting Director of the United States Patent and Trademark Office